(12) United States Patent
Khandekar et al.

(10) Patent No.: US 8,705,506 B2
(45) Date of Patent: Apr. 22, 2014

(54) TIME RESERVATION FOR A DOMINANT INTERFERENCE SCENARIO IN A WIRELESS COMMUNICATION NETWORK

(75) Inventors: Aamod D. Khandekar, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 932 days.

(21) Appl. No.: 12/269,696

(22) Filed: Nov. 12, 2008

(65) Prior Publication Data
US 2009/0131065 A1      May 21, 2009

Related U.S. Application Data

(60) Provisional application No. 60/988,662, filed on Nov. 16, 2007.

(51) Int. Cl.
*H04W 4/00* (2009.01)
*H04J 3/00* (2006.01)

(52) U.S. Cl.
USPC .................. 370/341; 370/345; 370/348

(58) Field of Classification Search
USPC ................ 370/329, 341, 345, 347, 348
See application file for complete search history.

(56) References Cited

U.S. PATENT DOCUMENTS

| | | | | |
|---|---|---|---|---|
| 5,822,699 | A * | 10/1998 | Kotzin et al. ............... | 455/447 |
| 6,253,063 | B1 * | 6/2001 | Cudak et al. ............... | 455/63.1 |
| 6,256,505 | B1 * | 7/2001 | Kingdon et al. ........... | 455/456.2 |
| 6,317,423 | B1 * | 11/2001 | Jantti et al. ................. | 370/347 |
| 6,493,331 | B1 | 12/2002 | Walton et al. | |
| 6,519,240 | B1 * | 2/2003 | Dillinger et al. ........... | 370/337 |
| 2002/0015393 | A1 * | 2/2002 | Pan et al. ................... | 370/335 |
| 2004/0053630 | A1 * | 3/2004 | Ramos et al. .............. | 455/500 |
| 2004/0057398 | A1 * | 3/2004 | Black .......................... | 370/321 |
| 2004/0228301 | A1 * | 11/2004 | Rudolf et al. .............. | 370/329 |

(Continued)

FOREIGN PATENT DOCUMENTS

| | | |
|---|---|---|
| CN | 1640167 A | 7/2005 |
| CN | 1989775 A | 6/2007 |

(Continued)

OTHER PUBLICATIONS

International Search Report, PCT/US2008/083685—Internation Search Authority—European Patent Office, Mar. 30, 2009.

(Continued)

*Primary Examiner* — Farah Faroul
(74) *Attorney, Agent, or Firm* — Stanton Braden

(57) ABSTRACT

Techniques for combating high interference in a dominant interference scenario are described. A terminal may observe high interference from an interfering base station in a dominant interference scenario. In an aspect, high interference may be combated by reserving time intervals for a serving base station. The terminal may communicate with the serving base station in the reserved time intervals and may avoid high interference that may desensitize a receiver at the terminal. In one design, the terminal may measure received power of base stations and may report its interference condition. The serving base station may receive a report from the terminal, determine that the terminal is observing high interference, and send a reservation request to the interfering base station to reserve time intervals. The interfering base station may grant the request and return a response. The serving base station may thereafter communicate with the terminal in the reserved time intervals.

48 Claims, 9 Drawing Sheets

(56) References Cited

U.S. PATENT DOCUMENTS

| | | | |
|---|---|---|---|
| 2005/0181814 A1 | 8/2005 | Okamoto et al. | |
| 2006/0009210 A1* | 1/2006 | Rinne et al. | 455/423 |
| 2006/0292989 A1* | 12/2006 | Gerlach et al. | 455/63.1 |
| 2007/0004423 A1* | 1/2007 | Gerlach et al. | 455/452.2 |
| 2007/0177631 A1* | 8/2007 | Popovic et al. | 370/478 |
| 2008/0008149 A1* | 1/2008 | Yang | 370/338 |
| 2008/0009280 A1* | 1/2008 | Ushiki et al. | 455/425 |
| 2008/0031197 A1* | 2/2008 | Wang et al. | 370/331 |
| 2008/0285477 A1* | 11/2008 | Kuroda et al. | 370/252 |
| 2009/0083601 A1* | 3/2009 | Gorokhov et al. | 714/748 |
| 2009/0092059 A1* | 4/2009 | Fu | 370/252 |
| 2009/0092178 A1* | 4/2009 | Sayana et al. | 375/227 |
| 2009/0201860 A1* | 8/2009 | Sherman et al. | 370/329 |
| 2009/0217118 A1* | 8/2009 | Miki et al. | 714/748 |
| 2009/0233598 A1* | 9/2009 | Fukuoka et al. | 455/434 |
| 2011/0212731 A1* | 9/2011 | Lee et al. | 455/450 |
| 2012/0135763 A1* | 5/2012 | Johnsson et al. | 455/501 |

FOREIGN PATENT DOCUMENTS

| | | |
|---|---|---|
| EP | 0802692 | 10/1997 |
| EP | 1489868 | 12/2004 |
| EP | 1489869 A1 | 12/2004 |
| EP | 2218292 | 8/2010 |
| GB | 2311912 | 10/1997 |
| JP | 2003219459 A | 7/2003 |
| JP | 2003264876 A | 9/2003 |
| WO | WO0205441 A2 | 1/2002 |
| WO | WO2005046259 A2 | 5/2005 |
| WO | 2005062798 | 7/2005 |

OTHER PUBLICATIONS

Written Opinion, PCT/US2008/083685—International Search Authority—European Patent Office, Mar. 30, 2009.
Taiwan Search Report—TW097144433—TIPO—Dec. 19, 2011.

* cited by examiner

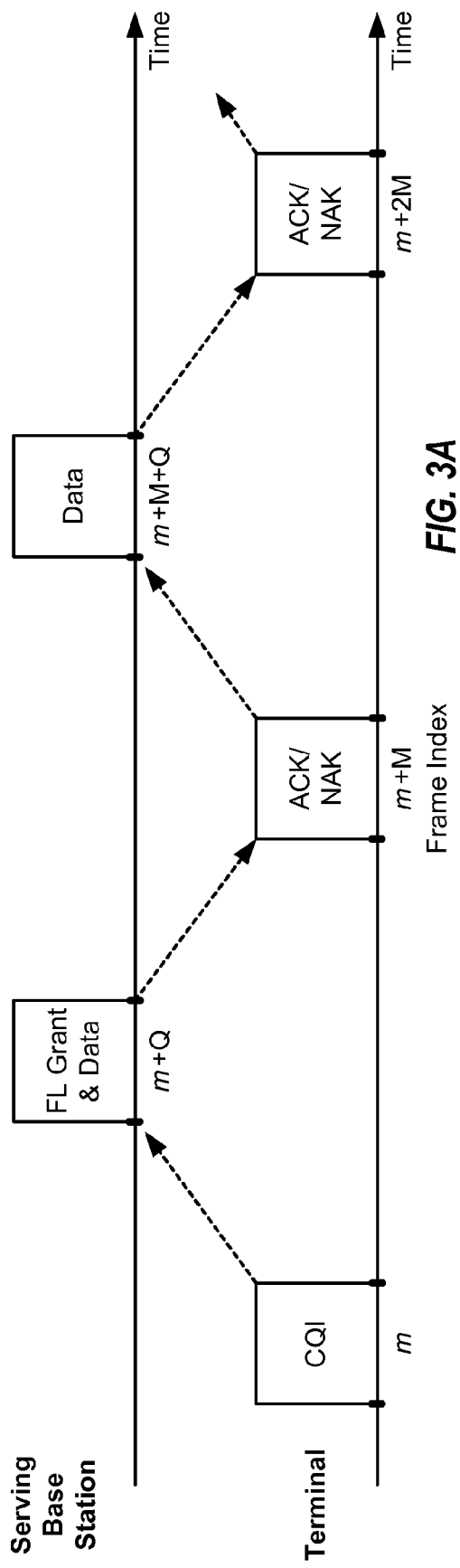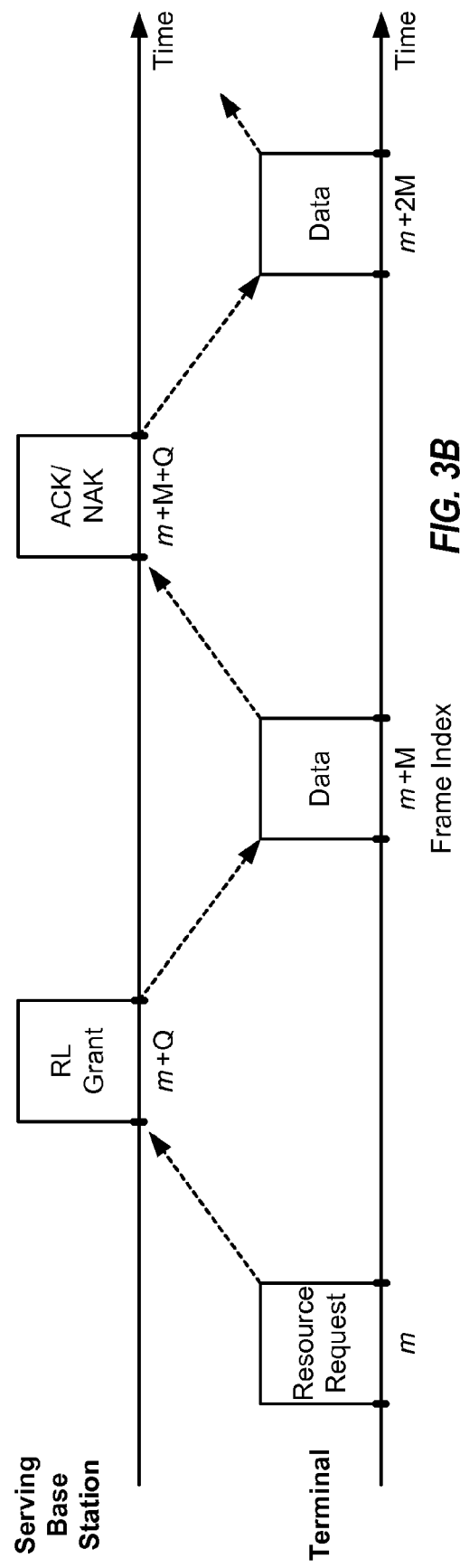

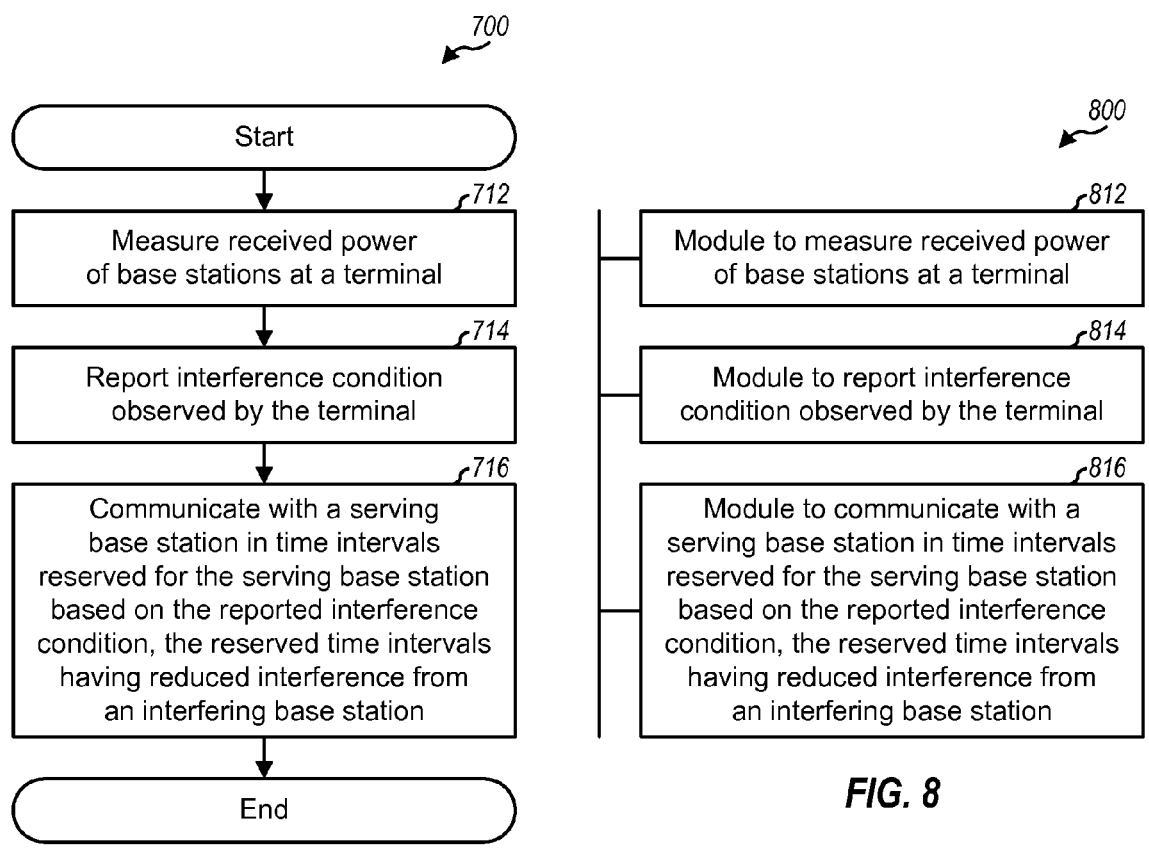

TIME RESERVATION FOR A DOMINANT INTERFERENCE SCENARIO IN A WIRELESS COMMUNICATION NETWORK

The present application claims priority to provisional U.S. Application Ser. No. 60/988,662, entitled "LONG-TERM INTERLACE PARTITIONING TO HANDLE DESENS," filed Nov. 16, 2007, assigned to the assignee hereof and incorporated herein by reference.

BACKGROUND

I. Field

The present disclosure relates generally to communication, and more specifically to transmission techniques for a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of terminals. A terminal may communicate with a serving base station via the forward and reverse links. The forward link (or downlink) refers to the communication link from the base station to the terminal, and the reverse link (or uplink) refers to the communication link from the terminal to the base station.

The serving base station may transmit data to the terminal on the forward link and/or may receive data from the terminal on the reverse link. On the forward link, the terminal may observe high interference from a neighbor base station and may be unable to correctly decode a data transmission from the serving base station. On the reverse link, a data transmission from the terminal may cause high interference to the neighbor base station, which may then be unable to correctly decode data transmissions sent by other terminals to the neighbor base station.

There is therefore a need in the art for techniques to combat high interference in order to improve performance.

SUMMARY

Techniques for combating high interference in a dominant interference scenario are described herein. A terminal may observe high interference from an interfering base station in a dominant interference scenario. The interference may be so high that the terminal may not be able to receive a desired signal from a serving/selected base station.

In an aspect, high interference in a dominant interference scenario may be combated by reserving time intervals for the serving base station. The reserved time intervals may correspond to frames in one or more interlaces and may have reduced (e.g., low or no) interference from the interfering base station. The terminal may communicate with the serving base station in the reserved time intervals and may be able to avoid high interference that may desensitize a receiver at the terminal.

In one design, the terminal may measure received power of base stations and may report its interference condition. The serving base station may receive a report of the interference condition observed by the terminal and may reserve time intervals for itself if the report indicates that the terminal is observing high interference. The serving base station may send a reservation request to the interfering base station to reserve time intervals. The interfering base station may grant the request and send a response to the serving base station. The serving base station may thereafter communicate with the terminal in the reserved time intervals.

The terminal may not be able to detect the serving base station or to open a connection with the serving base station prior to reservation of time intervals. In one design, the terminal may detect high interference from the interfering base station and may initiate clearing of some time intervals in order to detect and communicate with the serving base station. The terminal may send a message to the interfering base station to request it to clear some time intervals. The terminal may then exchange messages with the serving base station in the cleared time intervals to open a connection with the serving base station. The serving base station or the terminal may then initiate reservation of time intervals for the serving base station. The cleared time intervals may be valid for a short period whereas the reserved time intervals may be valid for an extended period.

Various aspects and features of the disclosure are described in further detail below.

BRIEF DESCRIPTION OF THE DRAWINGS

FIG. 3A shows data transmission on the forward link.

FIG. 3B shows data transmission on the reverse link.

FIGS. 7 and 8 show a process and an apparatus, respectively, for a terminal operating in an interference dominant scenario.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2).

Figure 1:
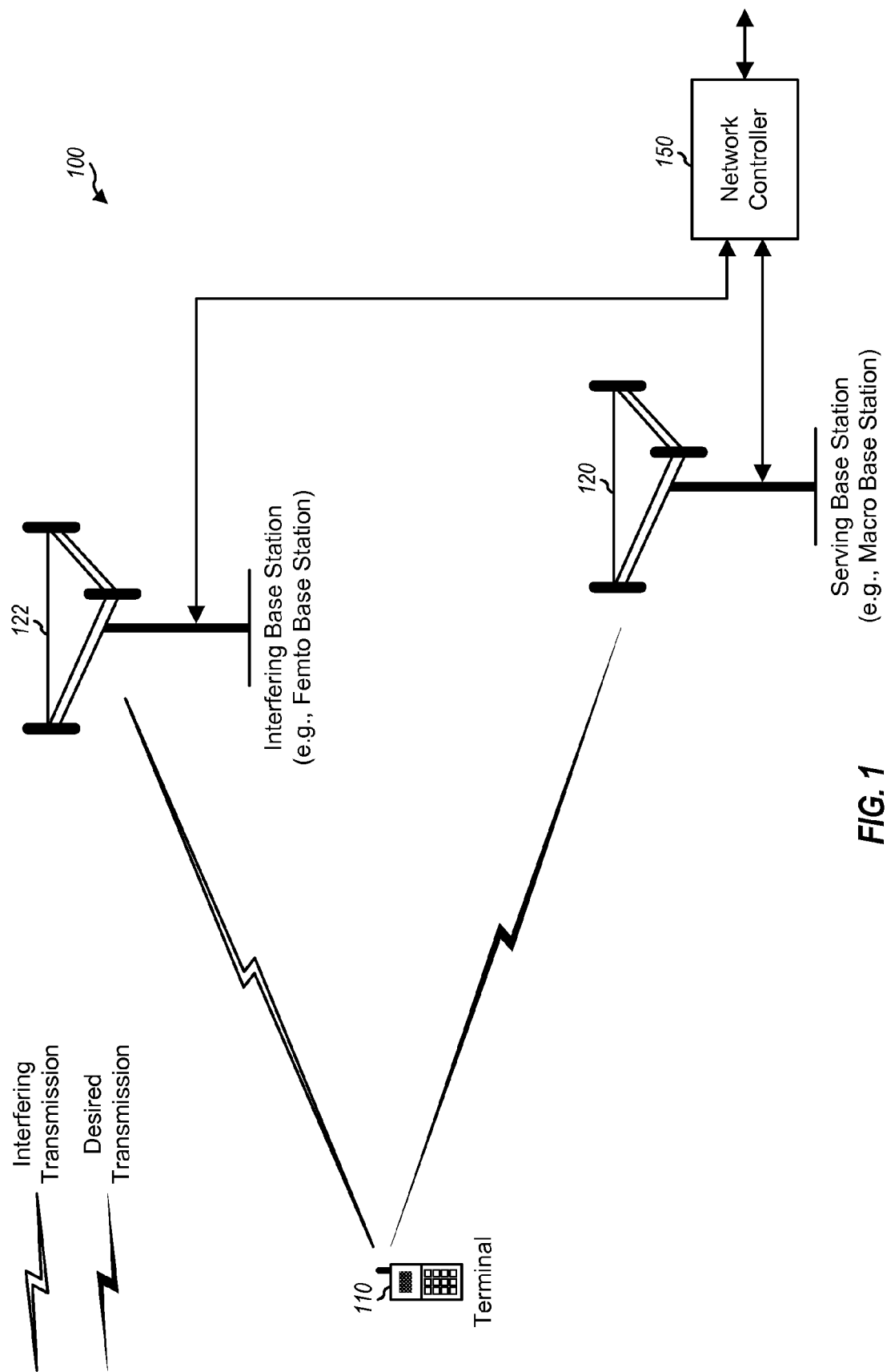
FIG. 1 shows a wireless communication network.

FIG. 1 shows a wireless communication network 100, which may include a number of base stations and other network entities. For simplicity, FIG. 1 shows only two base stations 120 and 122 and one network controller 150. A base station may be a fixed station that communicates with the terminals and may also be referred to as an access point, a Node B, an evolved Node B (eNB), etc. A base station may provide communication coverage for a particular geographic area. The overall coverage area of a base station may be partitioned into smaller areas, and each smaller area may be served by a respective base station subsystem. The term "cell" can refer to a coverage area of a base station and/or a base station subsystem serving this coverage area, depending on the context in which the term is used.

A base station may provide communication coverage for a macro cell, a pico cell, a femto cell, or some other type of cell. A macro cell may cover a relatively large geographic area (e.g., several kilometers in radius) and may support communication for all terminals with service subscription in the wireless network. A pico cell may cover a relatively small geographic area and may support communication for all terminals with service subscription. A femto cell may cover a relatively small geographic area (e.g., a home) and may support communication for terminals having association with the femto cell (e.g., terminals belonging to residents of the home). The terminals supported by a femto cell may belong in a closed subscriber group (CSG). A base station for a macro cell may be referred to as a macro base station. A base station for a pico cell may be referred to as a pico base station. A base station for a femto cell may be referred to as a femto base station or a home base station.

Network controller 150 may couple to a set of base stations and provide coordination and control for these base stations. Network controller 150 may communicate with base stations 120 and 122 via a backhaul. Base stations 120 and 122 may also communicate with one another, e.g., directly or indirectly via wireless or wireline interface.

A terminal 110 may be one of many terminals supported by wireless network 100. Terminal 110 may be stationary or mobile and may also be referred to as an access terminal (AT), a mobile station (MS), a user equipment (UE), a subscriber unit, a station, etc. Terminal 110 may be a cellular phone, a personal digital assistant (PDA), a wireless modem, a wireless communication device, a handheld device, a laptop computer, a cordless phone, a wireless local loop (WLL) station, etc.

Terminal 110 may communicate with a serving base station and may cause interference to and/or receive interference from one or more interfering base stations. A serving base station is a base station designated to serve a terminal on the forward and/or reverse link. An interfering base station is a base station causing interference to a terminal on the forward link and/or observing interference from the terminal on the reverse link. In FIG. 1, base station 120 is a selected base station for terminal 110 prior to system access and is a serving base station for terminal 110 after system access. Base station 122 is an interfering base station to terminal 110.

Figure 2:
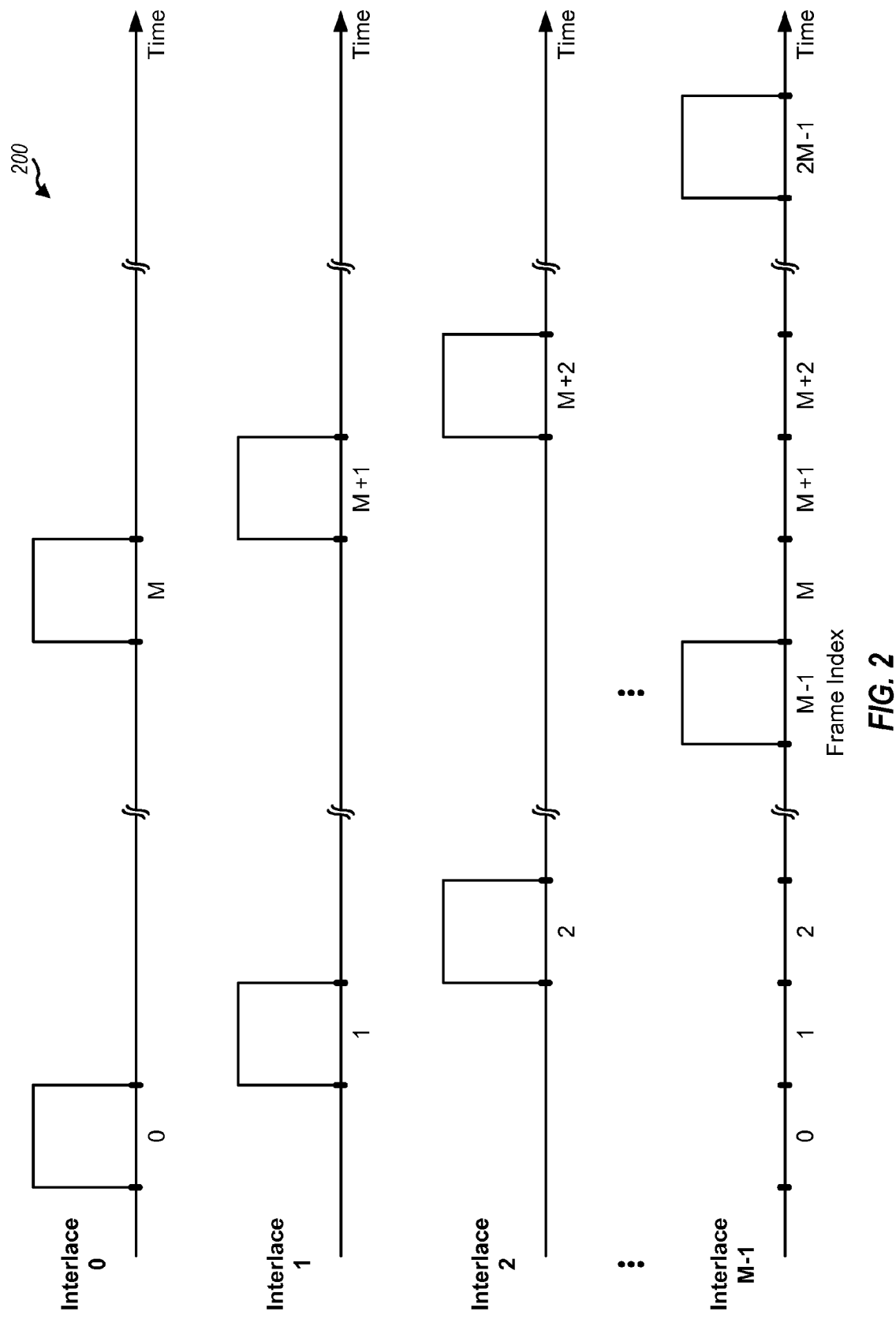
FIG. 2 shows an interlace transmission structure.

FIG. 2 shows an interlace transmission structure 200 that may be used for each of the forward and reverse links. The transmission timeline may be partitioned into units of frames. Each frame may cover a particular time duration, e.g., 1 milliseconds (ms). A frame may also be referred to as a subframe, a slot, etc.

M interlaces with indices of 0 through M−1 may be defined, where M may be equal to 4, 6, 8 or some other value. Each interlace may include frames that are spaced apart by M frames. For example, interlace 0 may include frames 0, M, 2M, etc., interlace 1 may include frames 1, M+1, 2M+1, etc., as shown in FIG. 2. The interlaces may be used for hybrid automatic retransmission (HARQ) and may be referred to as HARQ interlaces. For HARQ, one or more transmissions may be sent for a packet until the packet is decoded correctly or some other termination condition is encountered. All transmissions of the packet may be sent in different frames of a single interlace.

The interlaces for the forward link may be referred to as forward link (FL) interlaces, and the interlaces for the reverse link may be referred to as reverse link (RL) interlaces. In one design, the M FL interlaces may be associated with the M RL interlaces based on a one-to-one mapping. For example, FL interlace m may be associated with RL interlace $r=\{(m+Q) \mod M\}$, where Q is an offset (in number of frames) between the FL interlace and the associated RL interlace, and "mod" denotes a modulo operation. In one design, Q may be equal to M/2, and each FL interlace may be associated with a corresponding RL interlace that is M/2 frames away.

A pair of interlaces composed of an FL interlace and an associated RL interlace may support data transmission on both the forward and reverse links. For data transmission on the forward link, data and control information may be sent in frames of the FL interlace, and control/feedback information may be sent in frames of the associated RL interlace. For data transmission on the reverse link, data and control information may be sent in frames of the RL interlace, and control/feedback information may be sent in frames of the associated FL interlace. In general, control information may comprise any information used to support data transmission, e.g., channel information, grant information, feedback information, etc.

FIG. 3A shows data transmission on the forward link with one pair of interlaces, e.g., RL interlace m and FL interlace m+Q. Terminal 110 may periodically estimate the forward link channel quality for serving base station 120 and may send channel quality indicator (CQI) information in frame m of RL interlace m. Base station 120 may use the CQI information and/or other information to schedule terminal 110 for data transmission on the forward link and to select a modulation and coding scheme (MCS). Base station 120 may send an FL grant and data in frame m+Q of FL interlace m+Q. The FL grant may include the selected MCS, the assigned resources, etc. Terminal 110 may process the data transmission from base station 120 in accordance with the FL grant and, depending on the decoding result, may send an acknowledgement (ACK) or a negative acknowledgement (NAK) in frame m+M. Base station 120 may retransmit the data if a NAK is received and may transmit new data if an ACK is received. Data transmission on the forward link and ACK/NAK feedback on the reverse link may continue in similar manner.

FIG. 3B shows data transmission on the reverse link with one pair of interlaces, e.g., RL interlace m and FL interlace m+Q. Terminal 110 may have data to send to serving base station 120 and may send a resource request in frame m of RL interlace m. Base station 120 may schedule terminal 110 for data transmission on the reverse link and may send an RL grant in frame m+Q of FL interlace m+Q. The RL grant may include the selected MCS, the assigned resources, etc. Terminal 110 may send a data transmission in accordance with the RL grant in frame m+M. Base station 120 may process the data transmission from terminal 110 and, depending on the decoding result, may send an ACK or a NAK in frame m+M+Q. Terminal 110 may retransmit the data if a NAK is received and may transmit new data if an ACK is received. Data transmission on the reverse link and ACK/NAK feedback on the forward link may continue in similar manner.

As shown in FIGS. 3A and 3B, a pair of interlaces may support data transmission on the forward and/or reverse link. In one design, data transmission on the forward and reverse links may occur in different frames. In another design, data transmission on the forward and reverse links may occur in the same frame, e.g., using frequency division multiplexing (FDM), time division multiplexing (TDM), etc.

In general, data transmission on a first link may be supported with (i) one or more interlaces on the first link to send data and control information and (ii) one or more interlaces on a second link to send control/feedback information. The number of interlaces to use on each link may be dependent on the amount of data and control information to send on that link, the availability of interlaces for that link, etc. Data may be sent on one or multiple interlaces on the first link, and control/feedback information may be sent on one interlace on the second link.

Terminal 110 may operate in a dominant interference scenario, which may occur due to various reasons. For example, a dominant interference scenario may occur due to base stations transmitting at very different power levels, e.g., 20 Watts for macro base stations versus 1 Watt for pico and femto base stations. Terminal 110 may receive signals from two base stations 120 and 122 and may obtain lower received power for base station 120 than base station 122. Nevertheless, terminal 110 may desire to connect to base station 120 if the pathloss for base station 120 is lower than the pathloss for base station 122. This may be the case if base station 120 is a pico or femto base station (not shown in FIG. 1) and has significantly lower transmit power as compared to base station 122, which may be a macro base station (also not shown in FIG. 1). Terminal 110 may prefer to connect to base station 120 with lower received power since less interference may be caused to the network to achieve a given data rate.

A dominant interference scenario may also occur due to restricted association. Terminal 110 may be very close to base station 122 and may have the strongest channel and the highest received power for base station 122. However, terminal 110 may not belong in a CSG of base station 122 and may not be allowed to connect to base station 122. Terminal 110 may then connect to lower received power base station 120 and may observe high interference from base station 122.

Terminal 110 may observe high interference in a dominant interference scenario. The interference may be so high or strong that it may desensitize a receiver within terminal 110. Terminal 110 may perform automatic gain control (AGC) and may adjust a receiver gain such that an input signal provided to an analog-to-digital converter (ADC) within the receiver is at a target signal level in order to avoid clipping the ADC. The ADC input signal may comprise a desired signal from serving/selected base station 120 as well as high interference from interfering base station 122. The ADC input signal may be dominated by the high interference, and the desired signal level may be below the quantization noise level of the ADC. In this case, even if interfering base station 122 transmits on different frequency resources (e.g., a different set of subcarriers) as compared to serving base station 120, terminal 110 will still be unable to receive the desired signal from base station 120 since the desired signal will be masked by the ADC quantization noise. The high interference may thus desensitize the ADC of terminal 110. Terminal 110 may be unable to receive the desired signal from serving base station 120 in such a desensitization scenario.

Terminal 110 may be connected to serving base station 120 and may be desensed by interfering base station 122 on the forward link. It is likely that base station 122 will in turn be desensed by terminal 110 on the reverse link. Terminal 110 may thus be a victim on the forward link and an aggressor on the reverse link. Conversely, base station 122 may be an aggressor on the forward link and a victim on the reverse link. In such a symmetric desensitization scenario, neither terminal 110 nor base station 122 may be able to send data on the forward link or the reverse link. This is because transmission of data on one link typically requires transmission of control/feedback information (e.g., ACK/NAK) on the other link, as shown in FIGS. 3A and 3B. For example, even though terminal 110 may be a victim on only the forward link, terminal 110 may not be able to send data on the reverse link data because it cannot receive control/feedback information on the forward link.

In an aspect, desensitization of terminal 110 in a dominant interference scenario may be combated by reserving time intervals (e.g., a set of interlaces) for serving base station 120. The reserved time intervals may have low or no interference from interfering base station 122 and may be used for communication between terminal 110 and serving base station 120. This may allow terminal 110 to receive the desired signal from serving base station 120 and to avoid high interference from interfering base station 122.

In general, time given in any units may be reserved for serving base station 120. For clarity, much of the description below is for reservation of a set of interlaces, which may be referred to as a reserved set. The reserved set may include one or more FL interlaces that are reserved for base station 120. In one design, interfering base station 122 may avoid using (i.e., blank transmission on) the reserved FL interlace(s) so that terminal 110 can observe no interference from base station 122 on the reserved FL interlace(s). In another design, interfering base station 122 may send transmissions on the reserved FL interlace(s) in a manner such that terminal 110 can observe low or no interference from base station 122 on the reserved FL interlace(s). For example, interfering base station 122 may reduce its transmit power on the reserved FL interlace(s). Interfering base station 122 may also steer its power in a direction different from terminal 110, e.g., by placing terminal 110 in a spatial null.

Beamsteering may be performed based on spatial information, which may comprise precoding weights (e.g., a precoding matrix or vector), a channel estimate, and/or other information used by a transmitter to spatially steer its power. The spatial information may be obtained or provided in various manners. In one design, a spatial channel between interfering base station 122 and terminal 110 may be known to base station 122, e.g., on a long-term basis. In another design, terminal 110 may send to interfering base station 122 a message containing information on the spatial channel or a preferred beam between base station 122 and terminal 110. In yet another design, reciprocity between the forward and reverse links may be assumed, e.g., due to use of time division duplexing (TDD). Interfering base station 122 may then estimate a reverse link channel for terminal 110 and may use the reverse link channel estimate as a forward link channel estimate. For all of the designs, interfering base station 122 may derive precoding weights based on information on the spatial channel or may be provided with the precoding weights. Interfering base station 122 may then perform beamsteering with the precoding weights.

The reserved set may also include one or more RL interlace(s) that are reserved for terminal 110/serving base station 120. Terminal 110 may send data and/or control information in the reserved RL interlace(s) to serving base station 120. Interfering base station 122 may avoid using the reserved RL interlace(s) since it may observe high interference from terminal 110 on the reserved RL interlace(s).

In one design, the reserved FL interlace(s) and the reserved RL interlace(s) may be paired with one other. In this design, the number of reserved FL interlaces is equal to the number of reserved RL interlaces. The pairing may be such that a reserved FL interlace can carry data and a reserved RL interlace can carry control/feedback information to support data transmission, and vice versa, e.g., as shown in FIGS. 3A and 3B. A reserved FL interlace may be separated by M/2 frames from a reserved RL interlace. For example, with M=8, FL interlace 0 may be associated with RL interlace 4, FL interlace 1 may be associated with RL interlace 5, etc.

Figure 4:
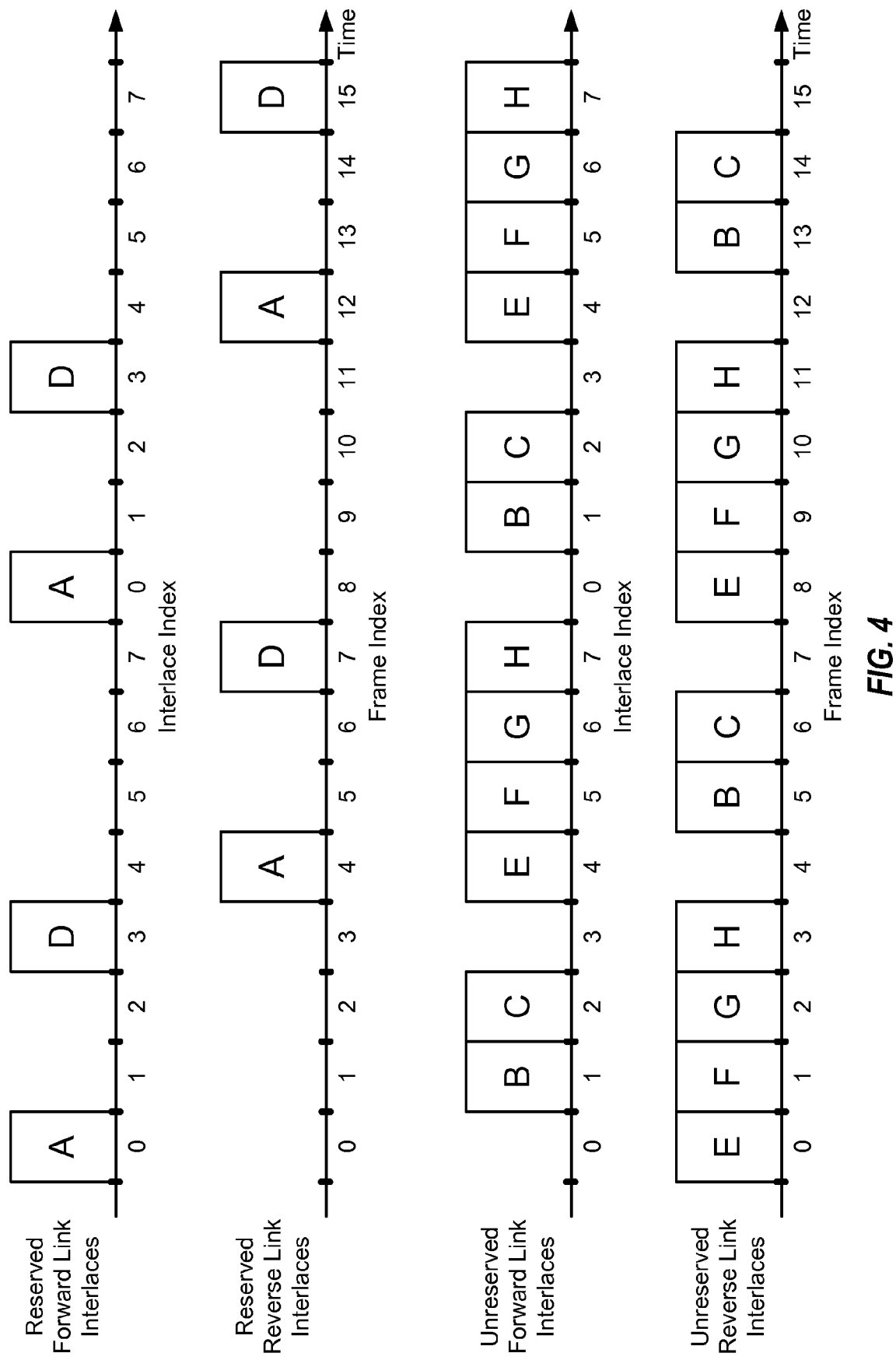
FIG. 4 shows an example of reserved interlaces for a base station.

FIG. 4 shows an example of an interlace reservation. In this example, M=8, and eight FL interlaces 0 through 7 and eight RL interlaces 0 through 7 may be available. Eight pairs of interlaces may be defined. Pair A may include FL interlace 0 and RL interlace 4, pair B may include FL interlace 1 and RL interlace 5, and so on, and pair H may include FL interlace 7 and RL interlace 3.

In the example shown in FIG. 4, interlace pairs A and D are reserved for base station 120. Base station 120 may transmit data and control information on FL interlaces 0 and 3 and may receive data and control information on RL interlaces 4 and 7 in reserved pairs A and D. Interlace pairs B, C, E, F, G and H are not reserved for base station 120. Base station 120 and/or 122 may transmit data and control information on FL interlaces 1, 2, 4, 5, 6 and 7 and may receive data and control information on RL interlaces 0, 1, 2, 3, 5 and 6 in pairs B, C, E, F, G and H.

For the design shown in FIG. 4, the reservation granularity may be in units of interlaces for each of the forward and reverse links. For a case of 8 interlaces, the reservation granularity may be ⅛=12.5%. In one design, the interlace reservation may be symmetric so that the number of reserved FL interlaces is equal to the number of reserved RL interlaces. In another design, the interlace reservation may be performed independently for each link. For this design, the number of reserved FL interlaces may or may not be equal to the number of reserved RL interlaces. In general, any number of interlaces may be reserved for each link and may be dependent on various factors such as the loading of all affected base stations, the priority of data and/or control information to send, etc.

In one design, different sets of interlaces may be reserved for base stations 120 and 122. Each base station may schedule transmissions of data and control information for its terminals on the set of interlaces reserved for that base station. Each base station may also avoid, reduce or steer transmission on the set of interlaces reserved for the other base station.

In another design, a set of interlaces may be reserved for serving base station 120. Interfering base station 122 may avoid, reduce or steer transmission on the set of interlaces reserved for base station 120. The unreserved interlaces may be used by any base station for transmission. In the example shown in FIG. 4, only base station 120 may use interlace pairs A and D, and base stations 120 and 122 may both use interlace pairs B, C, E, F, G and H. One or more interlace pairs may be reserved for base station 122, if needed.

Reservation of interlaces may be performed in various manners. In one design, the base stations may communicate with one another (e.g., via the backhaul or through a terminal) to reserve interlaces. In one design, interlace reservation may be achieved using upper-layer messages, which may be Layer 3 (L3) messages. Layer 3 may be responsible for resource partitioning and allocation in wireless network 100.

Figure 5:
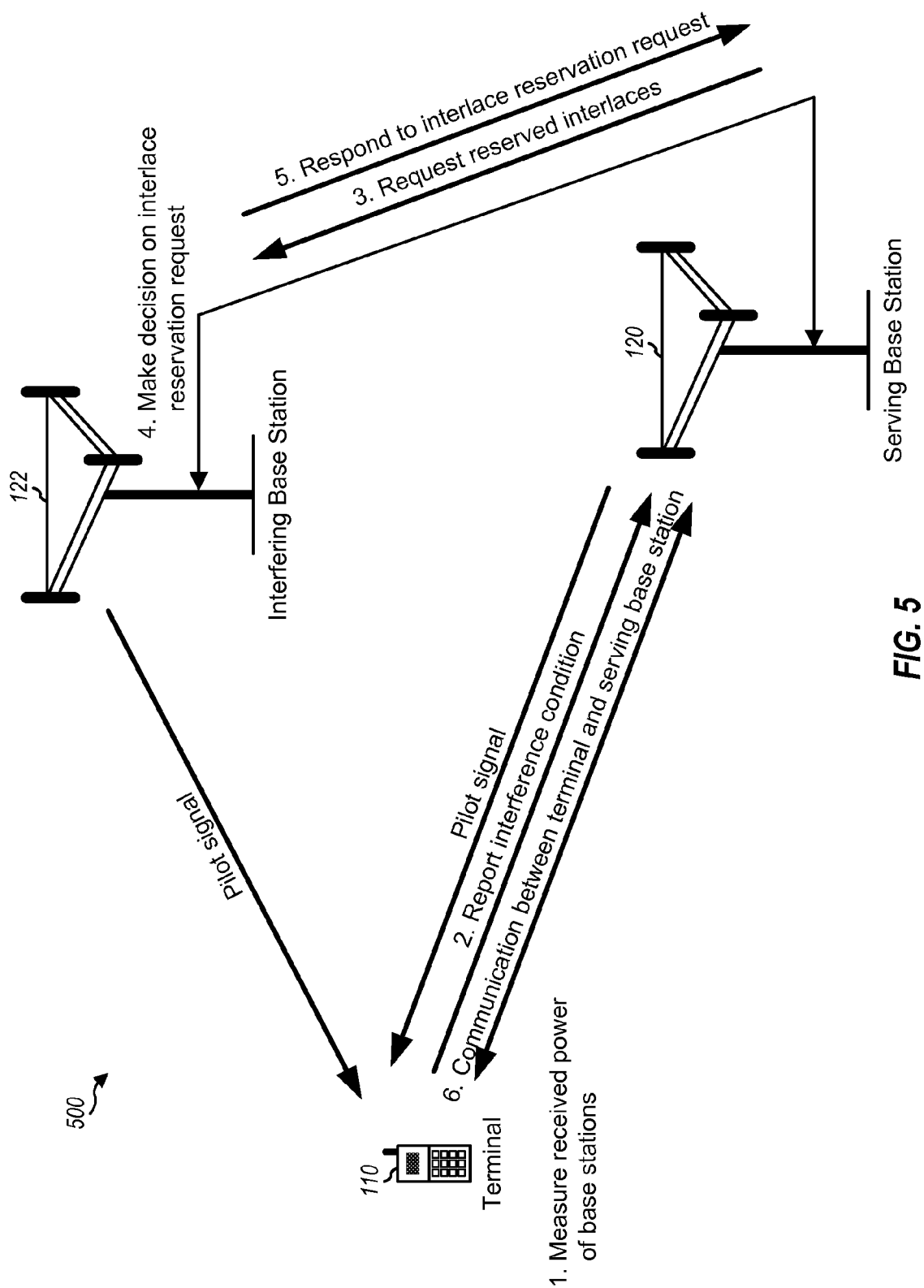
FIG. 5 shows an interlace reservation procedure.

FIG. 5 shows a design of an interlace reservation procedure 500. Terminal 110 may receive forward link signals (e.g., pilots) from base stations 120 and 122 and may measure the received power of each base station (step 1). Terminal 110 may desire to communicate with selected base station 120 and may observe high interference from interfering base station 122. For example, selected base station 120 may be a macro base station, and interfering base station 122 may be a strong nearby femto base station with restricted association. The interference from base station 122 may be so strong that it may desensitize the receiver at terminal 110. Terminal 110 may report its interference condition to selected base station 120 (step 2). The interference condition may be conveyed by a pilot measurement report, which may provide the received power for each base station detected by terminal 110. Terminal 110 may be able to exchange messages with selected base station 120 on certain resources that may be cleared of interference from interfering base station 122, as described below.

Selected base station 120 may receive the interference report from terminal 110 and may determine that terminal 110 is observing high interference. Base station 120 may then send a reservation request to interfering base station 122 (step 3). The request may indicate that base station 120 desires to reserve one or more interlaces on each link and may also provide information indicating the urgency of the request, the number of interlaces to reserve, which interlaces to reserve, etc. Interfering base station 122 may receive the request and decide whether to grant or dismiss the request (step 4). The decision may be based on various factors such as priority information in the request, loading at interfering base station 122, etc. Interfering base station 122 may grant all, some, or none of the interlaces requested by base station 120. The granted interlace(s), if any, may be reserved for base station 120 and may not be used by interfering base station 122.

Interfering base station 122 may send a reservation response containing its decision to selected base station 120 (step 5). The response may indicate the reserved interlaces for base station 120, the time period over which the reserved interlaces are valid, etc. Selected base station 120 may then communicate with terminal 110 on the reserved interlaces (step 6).

FIG. 5 shows a design in which selected base station 120 sends a request to reserve interlaces. In another design, terminal 110 may initiate interlace reservation by sending a message to selected base station 120 or interfering base station 122.

An interlace reservation may be valid for a certain period of time, which may be referred to as a reservation period. In one design, the reservation period may be a predetermined time period, which may be known a priori by both base stations 120 and 122 and may not need to be conveyed in the reservation request or response. In another design, the reservation period may be determined by selected base station 120 (e.g., based on data requirements and/or other factors) and sent in the reservation request. In yet another design, the reservation period may be decided by interfering base station 122 and sent in the reservation response. For example, the reservation request may provide a requested reservation period, and the reservation response may provide a granted reservation period, which may be all or a fraction of the requested reservation period. In any case, after the reservation period has elapsed, interfering base station 122 may transmit on the reserved interlaces. The interlace reservation procedure may then be repeated to reserve interlaces for serving base station 120.

The interlace reservation procedure in FIG. 5 assumes that terminal 110 can communicate over the air with selected base station 120, e.g., so that terminal 110 can report its interference condition. The interference from interfering base station 122 may be sufficiently high and may desensitize the desired signal from selected base station 120. Furthermore, if terminal 110 wakes up from an idle state in a dominant interference scenario, then terminal 110 may not be able to detect base station 120 or to establish communication with base station 120.

A bootstrap scheme may be used to allow terminal 110 to communicate with selected base station 120 in the presence of high interference from interfering base station 122. The bootstrap scheme may clear (i.e., to blank or vacate) a pair of interlaces that terminal 110 may use for initial communication with selected base station 120, e.g., to open a connection, to initiate interlace reservation, etc. A connection typically refers to an established communication session that allows for exchanges of data as well as signaling messages at higher layers, e.g., Layer 3 (L3). A connection may be opened by exchanging certain signaling messages.

Figure 6:
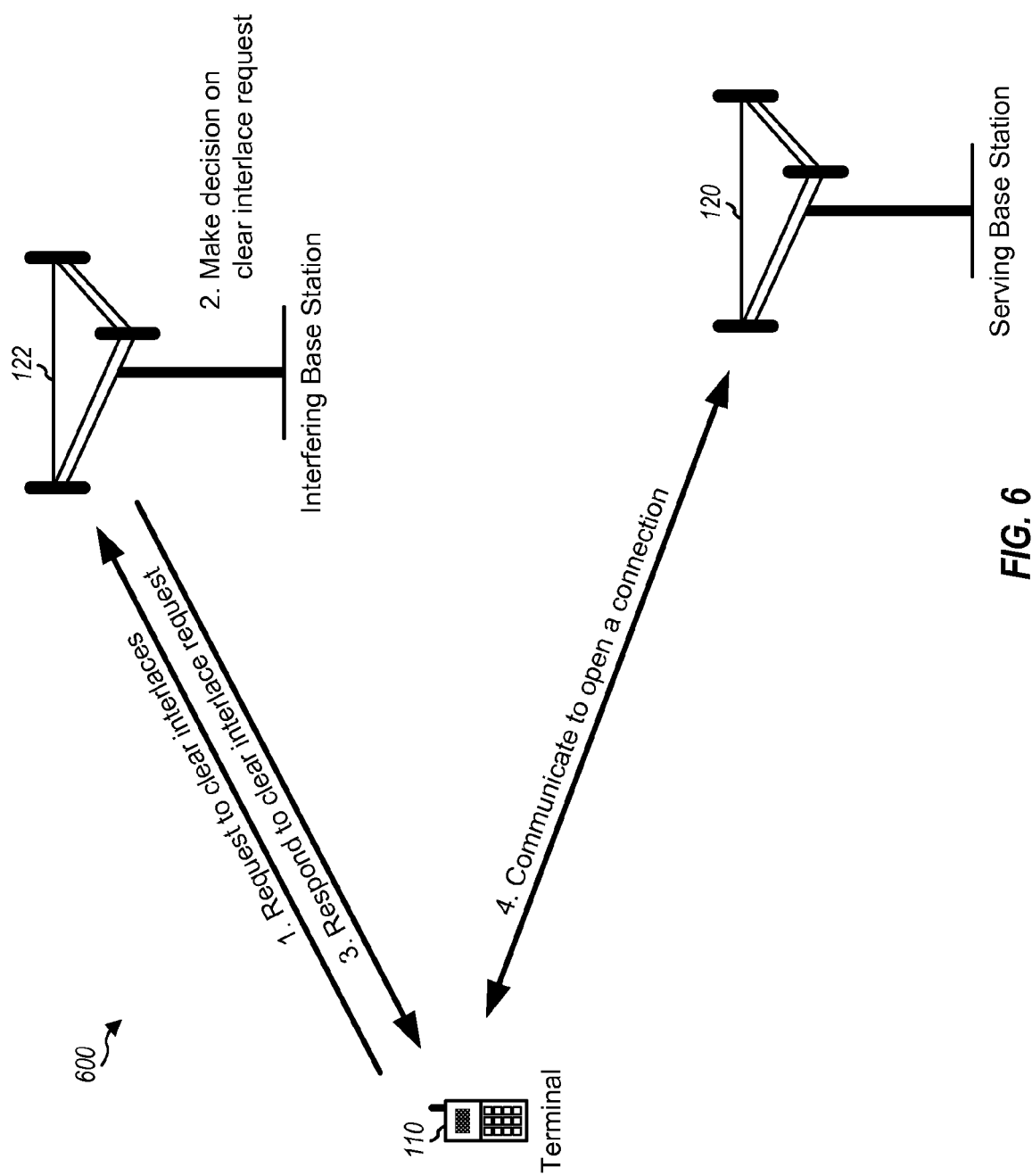
FIG. 6 shows an interlace clearing procedure.

FIG. 6 shows a design of a bootstrap procedure 600 to clear a pair of interlaces for terminal 110. Terminal 110 may detect high interference from interfering base station 122 and may send a request to clear interlaces to base station 122 (step 1). Interfering base station 122 may grant the request, clear an FL interlace and an RL interlace, and avoid using the cleared interlaces (step 2). Interfering base station 122 may send a response to inform terminal 110 of the cleared interlaces (step 3). Alternatively, terminal 110 may assume that certain designated interlaces will be cleared by the request, and interfering base station 122 may not send a response. In either case, terminal 110 may communicate with selected base station 120 on the cleared interlaces to open a connection, to initiate reservation of interlaces, etc. (step 4).

In a first bootstrap scheme, terminal 110 may first open a connection with interfering base station 122. Base station 122 may be a femto base station with restricted association and may not allow terminal 110 to send data via base station 122. However, base station 122 may allow terminal 110 to open a connection and send control information. After opening a connection, terminal 110 may send an L3 message to request base station 122 to clear a pair of interlaces. Terminal 110 may also send messages for interlace reservation during this time period. Terminal 110 may close the connection with interfering base station 122 after completing the interlace clearing and/or reservation procedure.

In a second bootstrap scheme, terminal 110 may request interfering base station 122 to clear a pair of interlaces by sending a control message at a Medium Access Control (MAC) layer, which may also be referred to as a Layer 2 (L2) message. The L2 message may be used, e.g., if terminal 110 is not allowed to open a connection with interfering base station 122. The L2 message may be sent over a control channel that may be cleared of interference from neighbor base stations. The L2 message may indicate that the clearing of interlaces is mandatory, e.g., does not depend on any priority information sent in the L2 message. The L2 message may also indicate that the clearing is valid for a predetermined time period instead of just one frame. The L2 message may also indicate a specific interlace to clear. Terminal 110 may open a connection with serving base station 120 and may also send messages for interlace reservation using the cleared interlaces.

The particular interlace to clear for each link may be determined in various manners. In one design, a specific interlace to clear for each link may be known a priori by terminal 110 and interfering base station 122, e.g., specified in a standard. In another design, terminal 110 may indicate a specific interlace to clear for each link in an L2 or L3 message. Interfering base station 122 may grant or deny the request for the indicated interlace. If the request is denied, then terminal 110 may follow a "trial and error" approach and may request interfering base station 122 to clear another interlace. In yet another design, terminal 110 may send a list of candidate interlaces to clear for each link or for both link. Interfering base station 122 may then select an interlace for each link from the list applicable for that link. In yet another design, terminal 110 may send a request without identifying any interlace. Interfering base station 122 may then select a specific interlace to clear for each link and may convey the cleared interlaces to terminal 110. In yet another design, interfering base station 122 may advertise specific interlace(s) that it may clear for each link via a broadcast message. Terminal 110 may then request interfering base station 122 to clear one of the advertised interlace(s) for each link.

In general, terminal 110 may send a message at any layer to request interfering base station 122 to clear or reserve interlaces. Terminal 110 may send an L3 message after establishing a connection with interfering base station 122. There may be longer delay in sending an L3 message due to overhead to establish a connection. However, the L3 message may have certain features such as encryption, authentication of the sender of the L3 message, etc. It may be desirable to use an L3 message to clear or reserve interlaces for an extended period of time. Alternatively, terminal 110 may send an L2 message without establishing a connection with interfering base station 122. There may be less delay and less overhead in sending an L2 message. However, an L2 message may be received in error. It may be desirable to avoid making a long-term decision based on an L2 message in case of an error.

Terminal 110 may be desensed by interfering base station 122 and may need to receive broadcast messages as well as paging messages from serving base station 120. This may be true even if terminal 110 is in an idle state and not actively communicating with base station 120. Terminal 110 may send an L2 or L3 message to clear resources for receiving broadcast transmissions carrying broadcast and paging messages. The broadcast transmissions may be sent in specific frames that may be known to terminal 110. Terminal 110 may request interfering base station 122 to clear the specific frames (and not an entire interlace) on which the broadcast transmissions are sent. These frames may be conveyed in the request or may be known to interfering base station 122.

For clarity, reservation of interlaces to combat high interference has been described above. In general, the techniques may be used to reserve time, which may be given by one or more interlaces, one or more frames or time intervals, or some other units of time. A reserved interlace may comprise periodic frames (e.g., as shown in FIG. 2) whereas the reserved frames or time intervals may or may not be periodic.

The time reservation techniques described herein may be used to combat high interference between two or more base stations that may cause desensitization at terminal 110. The base stations may be of different types, e.g., a macro base station and a femto base station. The base stations may also be of the same type, e.g., two femto base stations.

As noted above, terminal 110 may not be able to detect selected base station 120 in a dominant interference scenario. In one design, to aid detection of base stations by terminal 110, each base station may transmit a low reuse preamble (LRP) signal with time reuse. The time reuse may be achieved with (i) random time reuse where time periods for LRP signals from different base stations are pseudo-randomly selected or (ii) fixed time reuse where time periods for the LRP signals are pre-assigned, e.g., to be non-overlapping. Terminal 110 may be able to receive the LRP signal from selected base station 120 at a different time from the LRP signal of interfering base station 122. Detection of base stations may thus be enabled based on time reuse (possibly in addition to frequency reuse) of the LRP signals.

FIG. 7 shows a design of a process 700 performed by a terminal for communication in an interference dominant scenario. The terminal may measure received power of base stations (block 712). The terminal may report interference condition observed by the terminal (block 714). In one design, the terminal may send the measured received power and an identifier (ID) of an interfering base station to a serving/selected base station. The interference condition may also be conveyed in other manners. The terminal may communicate with the serving base station in time intervals reserved for the serving base station based on the reported interference condition (block 716). The reserved time intervals may have reduced (e.g., low or no) interference from the interfering base station and may correspond to frames in at least one interlace reserved for the serving base station.

In one design, the terminal may detect for the serving base station based on an LRP signal sent by the serving base station with time reuse. For example, the serving base station may send its LRP signal in time periods that may be non-overlapping or pseudo-random with respect to time periods used for an LRP signal sent by the interfering base station. The terminal may also detect for the serving base station after performing bootstrapping, as described above. The terminal may measure the received power of different base stations based on the LRP signals, pilots, and/or other transmissions from these base stations.

In one design, the terminal may exchange messages with the serving base station and/or the interfering base station to reserve time intervals for the serving base station. In another design, the serving and interfering base stations may exchange messages to reserve time intervals for the serving base station, e.g., as shown in FIG. 5. In one design, the terminal may send a message to the interfering base station to request the interfering base station to clear some time intervals. The message may comprise an L2 message or an L3 message. The terminal may then exchange messages with the serving base station in the cleared time intervals to open a connection with the serving base station.

In one design, the reserved time intervals may comprise first time intervals reserved for the forward link and second time intervals reserved for the reverse link. The terminal may receive forward link data and control information from the serving base station in the first time intervals. The terminal may send reverse link data and control information to the serving base station in the second time intervals. The terminal may also receive broadcast transmissions from the serving base station in time intervals having reduced interference from the interfering base station.

In one design, the terminal may communicate with the serving base station on all or a subset of the frequency resources in the reserved time intervals. The remaining frequency resources (if any) in the reserved time intervals may be (i) unused by the interfering base station if the terminal is observing high interference from the interfering base station or (ii) usable by the interfering base station if the terminal is not observing high interference from the interfering base station.

The interfering base station may have higher transmit power and higher pathloss than the transmit power and pathloss of the serving base station. The interfering base station may have restricted association, and the terminal may not be allowed to connect to the interfering base station.

FIG. 8 shows a design of an apparatus 800 for a terminal. Apparatus 800 includes a module 812 to measure received power of base stations, a module 814 to report interference condition observed by the terminal, and a module 816 to communicate with a serving base station in time intervals reserved for the serving base station based on the reported interference condition, with the reserved time intervals having reduced interference from an interfering base station.

Figure 9:
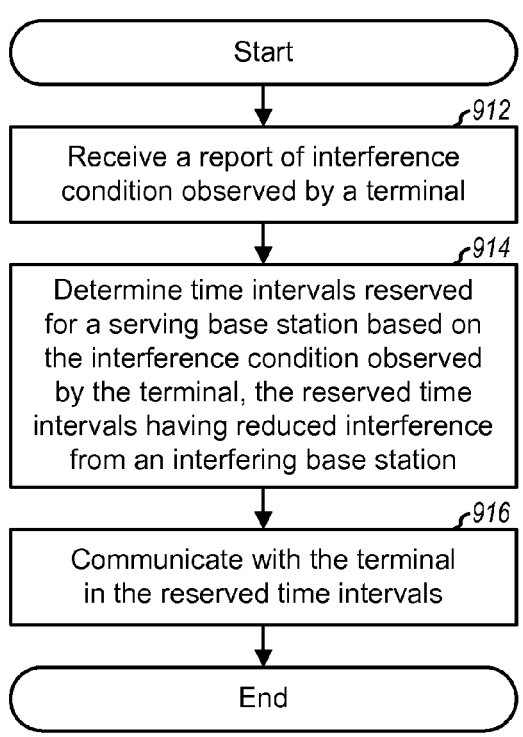
FIGS. 9 and 10 show a process and an apparatus, respectively, for a serving base station in an interference dominant scenario.

FIG. 9 shows a design of a process 900 performed by a serving base station for communication with a terminal operating in an interference dominant scenario. The serving base station may receive a report of interference condition observed by the terminal (block 912). The serving base station may determine time intervals reserved for it based on the interference condition observed by the terminal (block 914). The reserved time intervals may have reduced interference from an interfering base station. The serving base station may communicate with the terminal in the reserved time intervals (block 916).

In one design, the serving base station may reserve time intervals if the report indicates that the terminal is observing high interference from the interfering base station. The terminal may observe high interference if the received power for the interfering base station at the terminal exceeds a threshold, which may indicate that the terminal may be desensed by the interfering base station. In another design, the serving base station may reserve time and frequency resources for communication with the terminal if the report indicates that the terminal is not observing high interference from the interfering base station. In this design, the serving and interfering base stations may send transmissions on different frequency resources in the same time interval since the transmission from the interfering base station would not desensitize the terminal.

In one design of block 914, the serving base station may send a request for reserved time intervals to the interfering base station, e.g., as shown in FIG. 5. The serving base station may then receive a response from the interfering base station.

In one design, the serving base station may determine time intervals cleared by the interfering base station. The terminal may initiate clearing of time intervals and may inform the serving base station of the cleared time intervals. The serving base station may exchange messages with the terminal in the cleared time intervals to open a connection for the terminal.

The serving base station may send a message to the interfering base station to request the interfering base station to reduce (e.g., lower or avoid) interference in time intervals used for broadcast transmissions. The serving base station may send broadcast transmissions in the cleared time intervals having reduced interference from the interfering base station.

Figure 10:
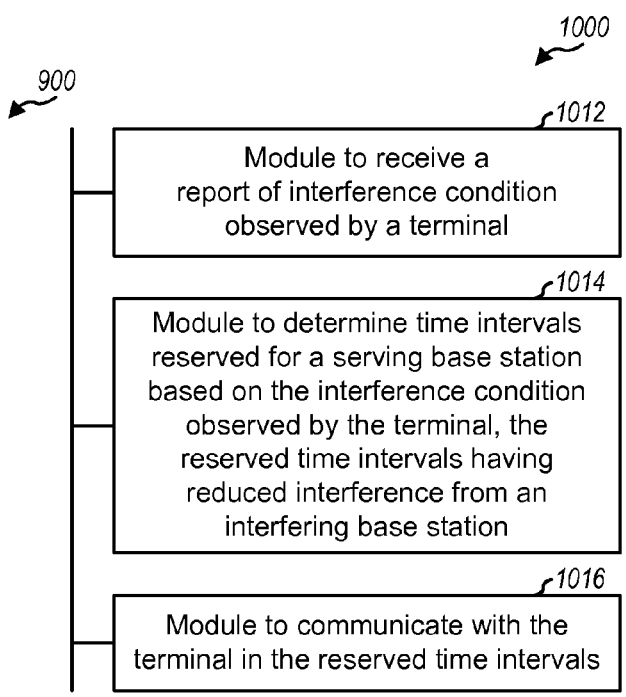

FIG. 10 shows a design of an apparatus 1000 for a serving base station. Apparatus 1000 includes a module 1012 to receive a report of interference condition observed by a terminal, a module 1014 to determine time intervals reserved for the serving base station based on the interference condition observed by the terminal, with the reserved time intervals having reduced interference from an interfering base station, and a module 1016 to communicate with the terminal in the reserved time intervals.

Figure 11:
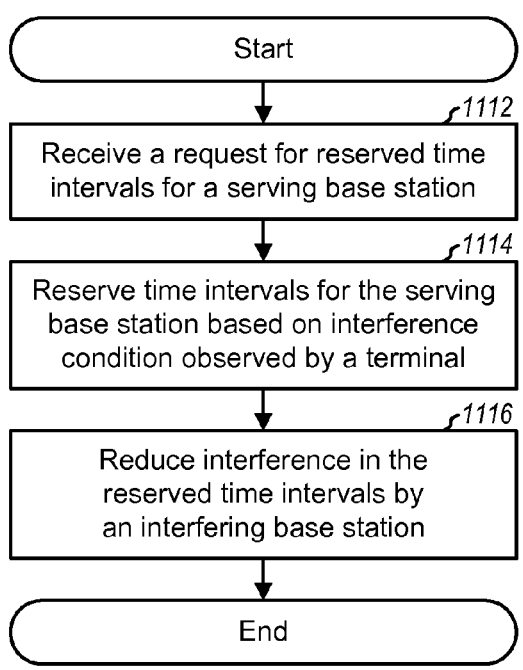
FIGS. 11 and 12 show a process and an apparatus, respectively, for an interfering base station in an interference dominant scenario.

FIG. 11 shows a design of a process 1100 performed by an interfering base station. The interfering base station may receive a request for reserved time intervals for a serving base station (block 1112). The request may be sent by the serving base station or a terminal based on interference condition observed by the terminal. The interfering base station may reserve time intervals for the serving base station in response to the request (block 1114). The interfering base station may send a response to the serving base station.

The interfering base station may reduce (e.g., lower or avoid) interference in the reserved time intervals (block 1116). In one design of block 1116, the interfering base station may avoid transmission in the reserved time intervals. In another design, the interfering base station may send transmission at a lower transmit power level in the reserved time intervals. In yet another design, the interfering base station may perform beamsteering for transmission sent in the reserved time intervals to steer the transmission in a direction different from the terminal.

The interfering base station may receive a message from the terminal to request the interfering base station to clear some time intervals for use by the terminal for initial communication, e.g., to open a connection with the serving base station. The interfering base station may reduce interference in the cleared time intervals. The interfering base station may also receive a message from the serving base station or the terminal to request the interfering base station to clear time intervals in which the serving base station will send broadcast transmissions. The interfering base station may reduce interference in the time intervals used for broadcast transmissions.

Figure 12:
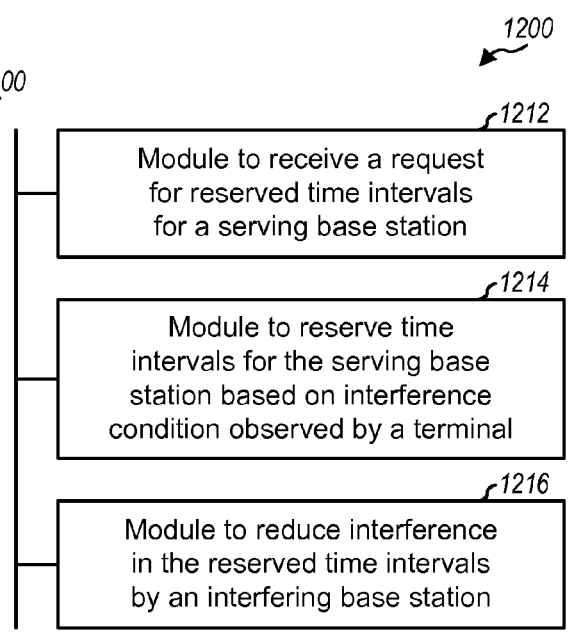

FIG. 12 shows a design of an apparatus 1200 for an interfering base station. Apparatus 1200 includes a module 1212 to receive a request for reserved time intervals for a serving base station, a module 1214 to reserve time intervals for the serving base station based on interference condition observed by a terminal, and a module 1216 to reduce interference in the reserved time intervals by an interfering base station.

The modules in FIGS. 8, 10 and 12 may comprise processors, electronics devices, hardware devices, electronics components, logical circuits, memories, etc., or any combination thereof.

Figure 13:
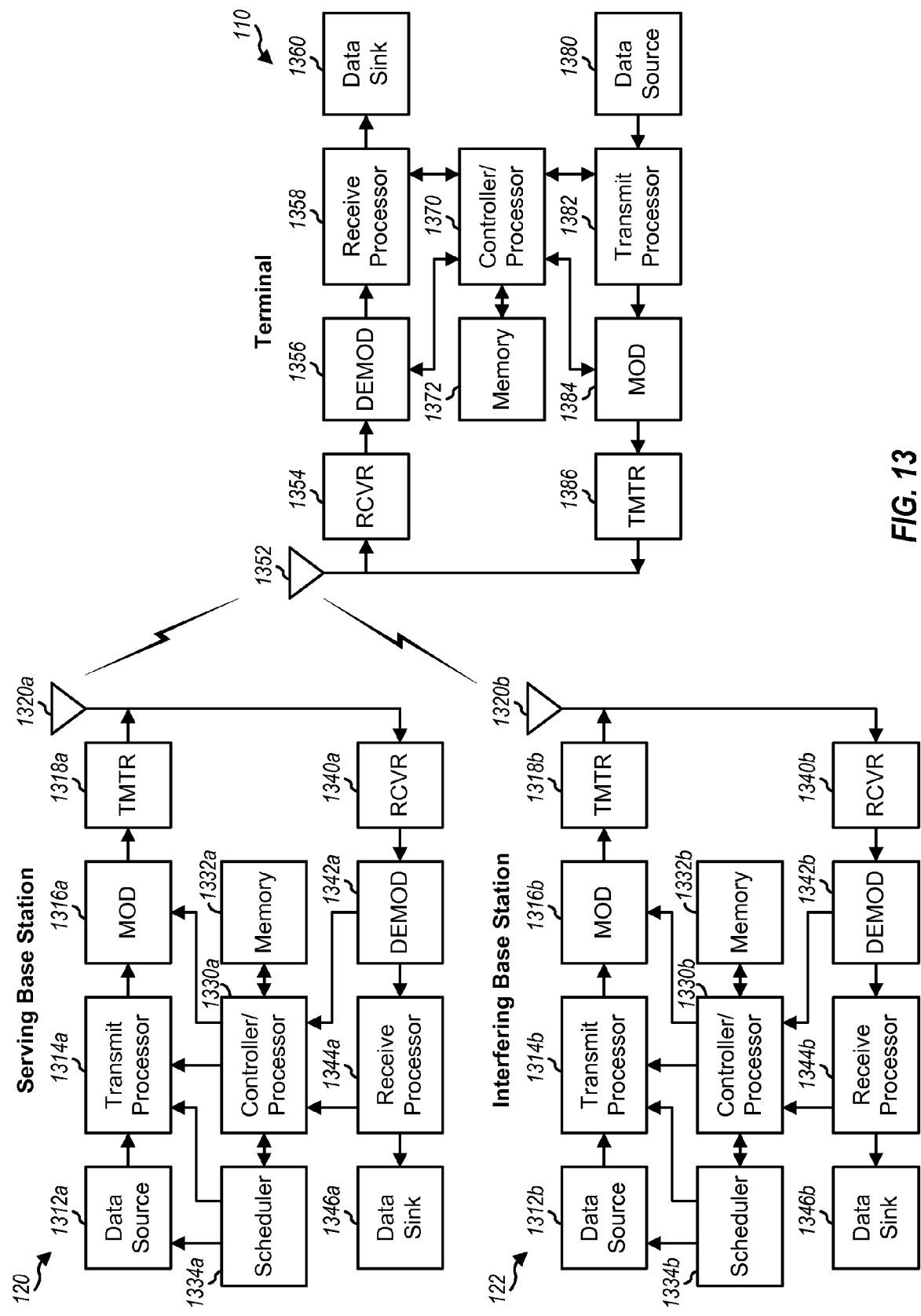
FIG. 13 shows a block diagram of the terminal, the serving base station, and the interfering base station.

FIG. 13 shows a block diagram of a design of terminal 110, serving base station 120, and interfering base station 122. At serving base station 120, a transmit processor 1314*a* may receive data from a data source 1312*a* and control information from a controller/processor 1330*a* and a scheduler 1334*a*. Controller/processor 1330*a* may provide messages for time/interlace reservation. Scheduler 1334*a* may provide grants for terminal 120. Transmit processor 1314*a* may process (e.g., encode and symbol map) the data, control information, and pilot and provide data symbols, control symbols, and pilot symbols, respectively. A modulator (MOD) 1316*a* may process the data, control, and pilot symbols (e.g., for OFDM, CDMA, etc.) and provide output samples. A transmitter (TMTR) 1318*a* may condition (e.g., convert to analog, amplify, filter, and upconvert) the output samples and generate a forward link signal, which may be transmitted via an antenna 1320*a*.

Interfering base station 122 may similarly process data and control information for the terminals served by base station 122. The data, control information, and pilot may be processed by a transmit processor 1314*b*, further processed by a modulator 1316*b*, conditioned by a transmitter 1318*b*, and transmitted via an antenna 1320*b*.

At terminal 110, an antenna 1352 may receive the forward link signals from base stations 120 and 122. A receiver (RCVR) 1354 may condition (e.g., filter, amplify, downconvert, and digitize) a received signal from antenna 1352 and provide input samples. A demodulator (DEMOD) 1356 may process the input samples (e.g., for OFDM, CDMA, etc.) and provide detected symbols. A receive processor 1358 may process (e.g., symbol demap and decode) the detected symbols, provide decoded data to a data sink 1360, and provide decoded control information to a controller/processor 1370.

On the reverse link, a transmit processor 1382 may receive and process data from a data source 1380 and control information (e.g., messages for time/interlace reservation) from controller/processor 1370. A modulator 1384 may process the symbols from processor 1382 (e.g., for OFDM, SC-FDM, CDMA, etc.) and provide output samples. A transmitter 1386 may condition the output samples and generate a reverse link signal, which may be transmitted via antenna 1352. At each base station, the reverse link signals from terminal 110 and other terminals may be received by antenna 1320, conditioned by a receiver 1340, demodulated by a demodulator 1342, and processed by a receive processor 1344. Processor 1344 may provide decoded data to a data sink 1346 and decoded control information to controller/processor 1330.

Controllers/processors 1330*a*, 1330*b* and 1370 may direct the operation at base stations 120 and 122 and terminal 110, respectively. Controller/processor 1370 at terminal 110 may perform or direct process 700 in FIG. 7 and/or other processes for the techniques described herein. Controller/processor 1330*a* at serving base station 120 may perform or direct process 900 in FIG. 9 and/or other processes for the techniques described herein. Controller/processor 1330*b* at interfering base station 122 may perform or direct process 1100 in FIG. 11 and/or other processes for the techniques described herein. Memories 1332*a*, 1332*b* and 1372 may store data and program codes for base stations 120 and 122 and terminal 110, respectively. Schedulers 1334*a* and 1334*b* may schedule terminals for communication with base stations 120 and 122, respectively, and may assign resources to the scheduled terminals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   reporting interference condition observed by a terminal; and
   communicating at least data transmission between the terminal and a serving base station in time intervals reserved for the serving base station based on the reported interference condition, the reserved time intervals having reduced interference from an interfering base station.

2. The method of claim 1, wherein the reserved time intervals correspond to frames in at least one interlace reserved for the serving base station.

3. The method of claim 1, wherein the reporting interference condition comprises
   measuring received power of the interfering base station, and
   sending the measured received power of the interfering base station to the serving base station.

4. The method of claim 3, wherein the reporting interference condition further comprises sending an identifier (ID) of the interfering base station to the serving base station.

5. The method of claim 3, wherein the measuring the received power of the interfering base station comprises
   receiving a pilot from the interfering base station, and
   measuring received power of the pilot from the interfering base station.

6. The method of claim 1, further comprising:
   detecting for the serving base station based on a low reuse preamble (LRP) signal sent by the serving base station in time periods non-overlapping or pseudo-random with respect to time periods used for an LRP signal sent by the interfering base station.

7. The method of claim 1, further comprising:
   exchanging messages with the serving base station or the interfering base station or both base stations to reserve time intervals for the serving base station.

8. The method of claim 1, further comprising:
   sending a message to the interfering base station to request the interfering base station to clear time intervals; and
   exchanging messages with the serving base station in the cleared time intervals to open a connection with the serving base station.

9. The method of claim 8, wherein the message comprises a Layer 2 (L2) message or a Layer 3 (L3) message.

10. The method of claim 1, wherein the reserved time intervals comprise first time intervals reserved for forward link and second time intervals reserved for reverse link, and wherein the communicating with the serving base station comprises
    receiving forward link data and control information from the serving base station in the first time intervals, and
    sending reverse link data and control information to the serving base station in the second time intervals.

11. The method of claim 1, wherein the communicating with the serving base station comprises communicating with the serving base station on all or a subset of frequency resources in the reserved time intervals, wherein remaining frequency resources in the reserved time intervals are unused by the interfering base station if the terminal is observing high interference from the interfering base station and are usable by the interfering base station if the terminal is not observing high interference from the interfering base station.

12. The method of claim 1, further comprising:
receiving broadcast transmissions from the serving base station in time intervals having reduced interference from the interfering base station.

13. The method of claim 1, wherein the interfering base station has higher transmit power and higher pathloss than transmit power and pathloss of the serving base station.

14. The method of claim 1, wherein the interfering base station has restricted association and the terminal is not allowed to connect to the interfering base station.

15. The method of claim 1, wherein the interference condition is reported directly by the terminal.

16. An apparatus for wireless communication, comprising:
at least one processor configured to report interference condition observed by a terminal, and to communicate at least data transmission between the terminal and a serving base station in time intervals reserved for the serving base station based on the reported interference condition, the reserved time intervals having reduced interference from an interfering base station.

17. The apparatus of claim 16, wherein the at least one processor is configured to measure received power of the interfering base station and to send the measured received power of the interfering base station to the serving base station.

18. The apparatus of claim 16, wherein the at least one processor is configured to send a message to the interfering base station to request the interfering base station to clear time intervals, and to exchange messages with the serving base station in the cleared time intervals to open a connection with the serving base station.

19. An apparatus for wireless communication, comprising:
means for reporting interference condition observed by a terminal; and
means for communicating at least data transmission between the terminal and a serving base station in time intervals reserved for the serving base station based on the reported interference condition, the reserved time intervals having reduced interference from an interfering base station.

20. The apparatus of claim 19, wherein the means for reporting interference condition comprises
means for measuring received power of the interfering base station, and
means for sending the measured received power of the interfering base station to the serving base station.

21. The apparatus of claim 19, further comprising:
means for sending a message to the interfering base station to request the interfering base station to clear time intervals; and
means for exchanging messages with the serving base station in the cleared time intervals to open a connection with the serving base station.

22. A computer program product, comprising:
a computer-readable medium comprising:
code for causing at least one computer to report interference condition observed by a terminal, and
code for causing the at least one computer to communicate at least data transmission between the terminal and a serving base station in time intervals reserved for the serving base station based on the reported interference condition, the reserved time intervals having reduced interference from an interfering base station.

23. A method for wireless communication, comprising:
determining time intervals reserved for a serving base station based on interference condition observed by a terminal, the reserved time intervals having reduced interference from an interfering base station; and
communicating at least data transmission between the serving base station and the terminal in the reserved time intervals.

24. The method of claim 23, further comprising:
receiving a report of the interference condition observed by the terminal; and
reserving time intervals for the serving base station based on the report.

25. The method of claim 23, further comprising:
sending a request for reserved time intervals to the interfering base station; and
receiving a response from the interfering base station.

26. The method of claim 23, further comprising:
receiving a report of the interference condition observed by the terminal;
reserving time intervals for the serving base station if the report indicates the terminal observing high interference from the interfering base station; and
reserving time and frequency resources for communication with the terminal if the report indicates the terminal not observing high interference from the interfering base station.

27. The method of claim 23, further comprising:
determining time intervals cleared by the interfering base station; and
exchanging messages with the terminal in the cleared time intervals to open a connection for the terminal.

28. The method of claim 23, further comprising:
sending broadcast transmissions in time intervals having reduced interference from the interfering base station.

29. The method of claim 28, further comprising:
sending a message to the interfering base station to request the interfering base station to reduce interference in the time intervals for the broadcast transmissions.

30. An apparatus for wireless communication, comprising:
at least one processor configured to determine time intervals reserved for a serving base station based on interference condition observed by a terminal, the reserved time intervals having reduced interference from an interfering base station, and to communicate at least data transmission between the serving base station and the terminal in the reserved time intervals.

31. The apparatus of claim 30, wherein the at least one processor is configured to receive a report of the interference condition observed by the terminal, and to reserve time intervals for the serving base station based on the report.

32. The apparatus of claim 30, wherein the at least one processor is configured to send a request for reserved time intervals to the interfering base station, and to receive a response from the interfering base station.

33. The apparatus of claim 30, wherein the at least one processor is configured to determine time intervals cleared by the interfering base station, and to exchange messages with the terminal in the cleared time intervals to open a connection for the terminal.

34. A method for wireless communication, comprising:
reserving time intervals for a serving base station based on interference condition observed by a terminal wherein data transmission is performed between the serving base station and the terminal in the reserved time intervals; and
reducing interference in the reserved time intervals by an interfering base station.

35. The method of claim 34, wherein the reserving time intervals for the serving base station comprises
- receiving a request for reserved time intervals from the serving base station, the request being sent based on the interference condition observed by the terminal,
- reserving time intervals for the serving base station in response to the request, and sending a response to the serving base station.

36. The method of claim 34, wherein the reducing interference in the reserved time intervals comprises avoiding transmission in the reserved time intervals by the interfering base station.

37. The method of claim 34, wherein the reducing interference in the reserved time intervals comprises reducing transmit power of transmission sent in the reserved time intervals by the interfering base station.

38. The method of claim 34, wherein the reducing interference in the reserved time intervals comprises performing beamsteering for transmission sent in the reserved time intervals to steer the transmission in a direction different from the terminal.

39. The method of claim 34, further comprising:
- receiving a message from the terminal to request the interfering base station to clear time intervals for use by the terminal for initial communication, and
- reducing interference in the cleared time intervals by the interfering base station.

40. The method of claim 34, further comprising:
- receiving a message from the serving base station or the terminal to request the interfering base station to clear time intervals in which the serving base station sends broadcast transmissions; and
- reducing interference in the cleared time intervals by the interfering base station.

41. An apparatus for wireless communication, comprising:
at least one processor configured to reserve time intervals for a serving base station based on interference condition observed by a terminal wherein data transmission is performed between the serving base station and the terminal in the reserved time intervals, and to reduce interference in the reserved time intervals by an interfering base station.

42. The apparatus of claim 41, wherein the at least one processor is configured to receive a request for reserved time intervals from the serving base station, the request being sent based on the interference condition observed by the terminal, to reserve time intervals for the serving base station in response to the request, and to send a response to the serving base station.

43. The apparatus of claim 41, wherein the at least one processor is configured to avoid transmission in the reserved time intervals by the interfering base station.

44. The apparatus of claim 41, wherein the at least one processor is configured to receive a message from the terminal to request the interfering base station to clear time intervals for use by the terminal for initial communication, and to reduce interference in the cleared time intervals by the interfering base station.

45. An apparatus for wireless communication, comprising:
- means for determining time intervals reserved for a serving base station based on interference condition observed by a terminal, the reserved time intervals having reduced interference from an interfering base station; and
- means for communicating transmission data between the serving base station and the terminal in the reserved time intervals, 46. A non-transitory computer-readable medium having computer executable instructions stored thereon, the instructions comprising:
- code for causing at least-one computer to determine time intervals reserved for a serving base station based on interference condition observed by a terminal, the reserved time intervals having reduced interference from an interfering base station; and
- code for causing the at least one computer to communicate transmission data between the serving base station and the terminal in the reserved time intervals.

47. An apparatus for wireless communication, comprising:
- means for reversing time intervals for a serving base station based on interference condition observed by a terminal wherein data transmission is performed between the serving base station and the terminal in the reserved time intervals; and
- means for reducing interference in the reserved time intervals by an interfering base station.

48. A non-transitory computer-readable medium having computer executable instructions stored thereon, the instructions comprising:
- code for causing at least one computer to reserve time intervals for a serving base station based on interference condition observed by a terminal wherein data transmission is performed between the serving base station and the terminal in the reserved time intervals; and
- code for causing the at least one computer to reduce interference in the reserved time intervals by an interfering base station.

* * * * *